US006606151B2

(12) United States Patent
Kunkel et al.

(10) Patent No.: US 6,606,151 B2
(45) Date of Patent: Aug. 12, 2003

(54) GRATING PATTERNS AND METHOD FOR DETERMINATION OF AZIMUTHAL AND RADIAL ABERRATION

(75) Inventors: Gerhard Kunkel, Radebeul (DE); Shahid Butt, Ossining, NY (US); Joseph Kirk, Chelsea, NY (US)

(73) Assignees: Infineon Technologies AG, Munich (DE); International Business Machines Corporation, Armonk, NY (US)

( * ) Notice: Subject to any disclaimer, the term of this patent is extended or adjusted under 35 U.S.C. 154(b) by 5 days.

(21) Appl. No.: 09/916,917

(22) Filed: Jul. 27, 2001

(65) Prior Publication Data

US 2003/0020901 A1 Jan. 30, 2003

(51) Int. Cl.[7] .......................... G01B 9/00; G01B 11/02; G01B 5/18
(52) U.S. Cl. .................. 356/124; 359/575; 356/515
(58) Field of Search .................. 356/124, 127, 356/515, 521; 359/566, 575, 569, 574

(56) References Cited

U.S. PATENT DOCUMENTS

| 5,299,062 A | * | 3/1994 | Ogata .......................... 359/571 |
| 5,442,480 A | * | 8/1995 | Swanson et al. ............. 359/355 |
| 6,091,486 A | * | 7/2000 | Kirk ............................ 356/124 |
| 6,174,741 B1 | | 1/2001 | Hansch et al. ................. 438/14 |

OTHER PUBLICATIONS

J.P. Kirk, C.P. Progler, Application of Blazed Gratings for Determination of Equivalent Primary Azimuthal Aberrations, Proc. Spie, vol. 3679, p. 70 (1999).

* cited by examiner

Primary Examiner—Loha Ben
Assistant Examiner—William Choi
(74) Attorney, Agent, or Firm—Stanton Braden

(57) ABSTRACT

Methods and reticles for evaluating lenses are disclosed. In one instance, a reticle which permits light to pass therethrough is provided which includes a first surface with a grating profile formed thereon. The grating profile includes a plurality of grouped stepped portions. Each group of the stepped portions includes a first step which prevents light from propagating therethrough, a second step which propagates light therethrough and a third step which propagates light therethrough at an angle 60 degrees out of phase with the light propagated through the second step.

35 Claims, 8 Drawing Sheets

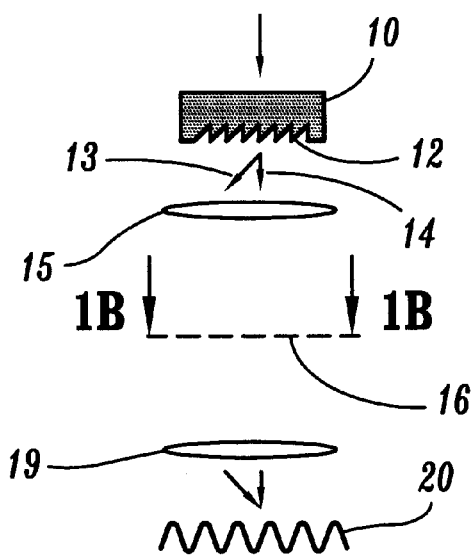
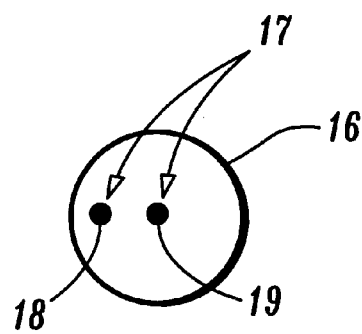
FIG. 1A
FIG. 1B
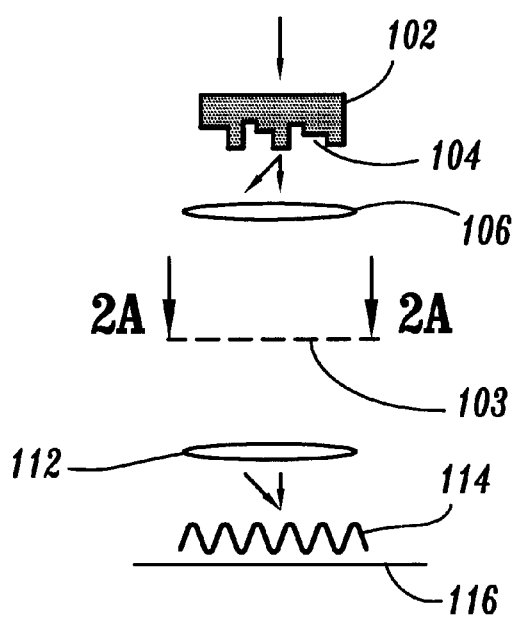
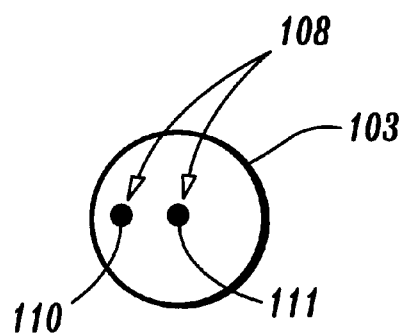
FIG. 2A
FIG. 2B

GRATING PATTERNS AND METHOD FOR DETERMINATION OF AZIMUTHAL AND RADIAL ABERRATION

BACKGROUND

1. Technical Field

This disclosure relates to measuring lens aberration, and more particularly, to a grating pattern and a method for measuring azimuthal and radial aberrations for lenses which provide a simple and powerful way to determine the lens quality of any stepper.

2. Description of the Related Art

Optical lithography for semiconductor production systems is beginning to employ resist images with dimensions comparable to the wavelengths of light used to form the images. In an attempt to satisfy the demand for smaller images, various image enhancement schemes have been employed in the art. Some of these schemes include modifying illumination and phase shifting reticles to attempt to achieve finer images. Effective implementation of these techniques, however, requires more accurate lenses. Lens fabricators are responding by building lenses with reduced residual aberrations.

As is known in the art, all lenses have residual aberrations despite the best efforts of lens fabricators. It is difficult for lithographers to determine if the level of performance needed for a lens is in fact supplied by a particular lens without actually producing products (e.g., semiconductor products). One effective way to determine the level of performance, without producing product, is to use full wave front aberration data, such as, obtained from a Phase Measuring Interferometer (PMI) at the time of lens fabrication. Often the PMI record is not available to the lithographer, and even when available, the PMI record may not represent the lens at the time of use.

In an article by J. Kirk et al. entitled "Application of blazed gratings for determination of equivalent primary azimuthal aberrations," Proc. SPIE, vol. 3679, pg. 70 (1999) (hereinafter J. Kirk et al.), azimuthal aberrations are determined by employing a blazed grating. In J. Kirk et al., aberrations were determined from wafers exposed using a test reticle having blazed gratings with orientations from 0 to 360 degrees in increments of typical 22.5 degrees. As described in J. Kirk et al. in section 3.1, in concept, the blazed grating should be made to diffract light in only two orders. However, using the blazed grating as described in J. Kirk et al., three peak intensity regions or split peak images were seen in the image of the phase grating (see FIG. 5b of J. Kirk et al.).

It would be desirable to achieve a 2-beam illumination in the image of the phase grating as this would increase the sensitivity and the accuracy of the lens system evaluation. However, technology for fabricating a truly blazed grating is extremely difficult.

Therefore, a need exists for a simple and easy-to-manufacture grating for evaluating lenses. A further need exists for a blazed grating, which provides a true 2-beam illumination image to improve lens evaluation symmetry. A further need exists for a method for measuring azimuthal and radial aberrations for lenses to determine the lens quality for photolithographic processes.

SUMMARY OF THE INVENTION

Methods and reticles for evaluating lenses are disclosed. In one instance, a reticle which permits light to pass therethrough is provided which includes a first surface with a grating profile formed thereon. The grating profile includes a plurality of grouped stepped portions. Each group of the stepped portions includes a first step which prevents light from propagating therethrough, a second step which propagates light therethrough and a third step which propagates light therethrough at an angle 60 degrees out of phase with the light propagated through the second step.

Another embodiment for a reticle for evaluating a lens, includes a reticle, which permits light to pass therethrough. The reticle includes a first surface. A grating profile is formed on the first surface, and the grating profile includes a plurality of grouped stepped portions. Each group of the stepped portions has a first step which propagates light therethrough at a first phase angle, a second step which propagates light therethrough at an angle 90 degrees out of phase with the first phase angle and a third step which propagates light therethrough at an angle 180 degrees out of phase with the first phase angle.

Methods employing these structures are also disclosed for evaluating lens systems in accordance with the invention.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 1A is a schematic diagram showing an "ideal" set up for evaluating a lens with a blazed grating;

FIG. 1B is a cross-sectional view of an ideal illumination image taken with a blazed grating;

FIG. 2A is a schematic diagram showing a set up for evaluating a lens with a reticle having a grating profiles in accordance with the present invention;

FIG. 2B is a cross-sectional view of an illumination image taken with a phase grating of the present invention;

DETAILED DESCRIPTION OF PREFERRED EMBODIMENTS

Figure 3:
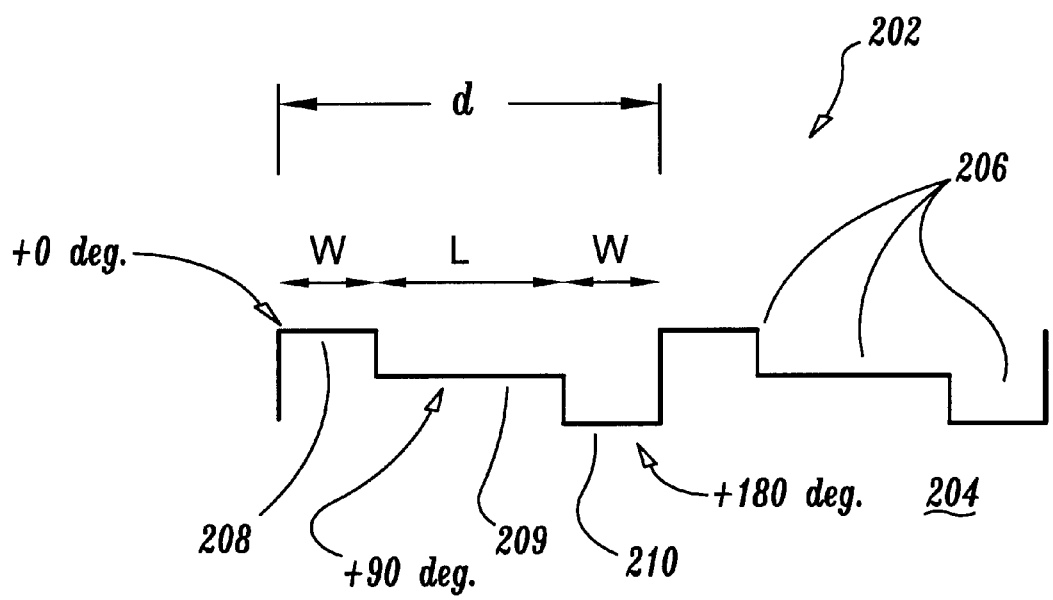
FIG. 3 is a cross-sectional view showing a grating profile in accordance with one embodiment of the present invention.

The present invention provides simple methods for evaluating a lens, preferably a lens employed in photolithographic processing. The present invention is capable of simultaneously measuring coma, astigmatism, spherical, 3-leaf (3-foil) and 4-leaf (4-foil) aberrations in a lens system. Coma, astigmatism, spherical, 3-leaf (3-foil) and 4-leaf (4-foil) aberrations of a lens are known in the art. However, the present invention can perform measurement of all these characteristics, and others, in a single set up, of for example, a lithography tool, using the lens system. The present invention advantageously provides an easy to manufacture blazed grating structure, and a method for employing the blazed grating to more accurately evaluate a lens system for aberrations, for example, radial aberrations and azimuthal aberrations.

Referring now in specific detail to the drawings in which like reference numerals identify similar or identical elements throughout the several views, and initially to FIGS. 1A and 1B, a reticle 10 having an ideal blazed grating 12 is shown. A blazed grating will diffract light preferentially in one direction. A simple grating will diffract light in the same way on either side of the zeroth order, assuming light is incident normal to the grating surface. Blazed grating 12 ideally separates light entering it into two portions 13 and 14. The two portions are focused by a lens or lens system 15 onto a pupil plane 16 (FIG. 1B) to produce an illumination pattern 17. In the "ideal" case, illumination pattern 17 includes a two peak illumination images (peaks 18 and 19). Although the 2-beam image is desirable, this 2-beam image is difficult to achieve. In many instances, 3-beam illuminations and/or split or double beam illuminations occur. These 3 beam illuminations reduce sensitivity of aberration measurements.

The image of the phase grating (illumination pattern 17) is focused by lens or lens system 19 and printed on a surface of a high absorption photoresist 20. Alternatively, a camera or photosentive material may be employed to capture this image. Again, an ideal blazed grating gives an image with a sinusoidal relief in the high absorption photoresist 20 or other image capture device.

The diffraction efficiency of the image may be recorded as a digitized dark-field image and processed to evaluate the aberrations. One method, described by J. Kirk et al., micro steps the image of the phase grating through focus and matches the simulated dark-field images to those recorded in the photoresist 20. Depending on the angular orientation of the diffraction grating (or portions of the grating), different regions of the pupil will form the image at different focal planes. It is this variation of focus with azimuthal orientation of the grating, pupil location, that is used to determine the aberrations.

Referring to FIGS. 2A and 2B, the present invention provides a grating profile, which is not a blazed phase structure, and which provides a truly 2-beam illumination of the image. A reticle 102 of the present invention includes a non-blazed profile 104, which separates light passing through reticle 102. Reticle 102 may be made from the same material used for printing integrated circuit patterns, e.g., quartz or any other transparent material. In one embodiment, reticle 102 is about 0.25 inches thick and relief steps are appropriately sized to give the phase step needed, for example, 81 nm in the case of FIG. 9A. Any light wavelength may be employed for the present invention. Preferred wavelengths may include 248 nm, 193 nm and 157 nm.

A lens system 106 focuses an image on a pupil plane 103 shown in FIG. 2B as illumination pattern 108. Surprisingly, the present invention provides a two-beam illumination image, where image 110 is a first order diffraction and image 111 is the zeroth order diffraction. Light is focused by lens system 112 to provide an image with sinusoidal relief 114 on a photoresist 116 or other imaging device. Lens 106 may be the lens to be tested in this configuration.

Referring to FIG. 3, a phase grating 202 for a reticle 204 is shown in accordance with a preferred embodiment of the present invention. A profile 206 of grating 202 advantageously provides a 2-beam illumination (FIG. 2B) with light passing therethrough, without using a blazed phase structure. Profile 206 includes three phase regions 208–210, each phase region 208–210 provides light 90 degrees out of phase relative to an adjacent region. In one embodiment, region 208 provides a 0 degree phase shift for light exiting relative to the light entering reticle 204, region 209 provides 90 degree phase shifted light and region 210 provides 180 degree phase shifted light. Region 209 includes a width L which is preferably twice a width W of regions 208 and 210 to ensure two-beam illumination (e.g., L=2W). In an illustrative embodiment, W=0.15 $\mu$m and L=0.3 $\mu$m. Other dimensions are contemplated based on the accuracy or sensitivity desired for the evaluation of a lens system, and depending on the wavelength of light employed for the evaluation. Also, mask topography effects may require small modifications for L and W.

Figure 4:
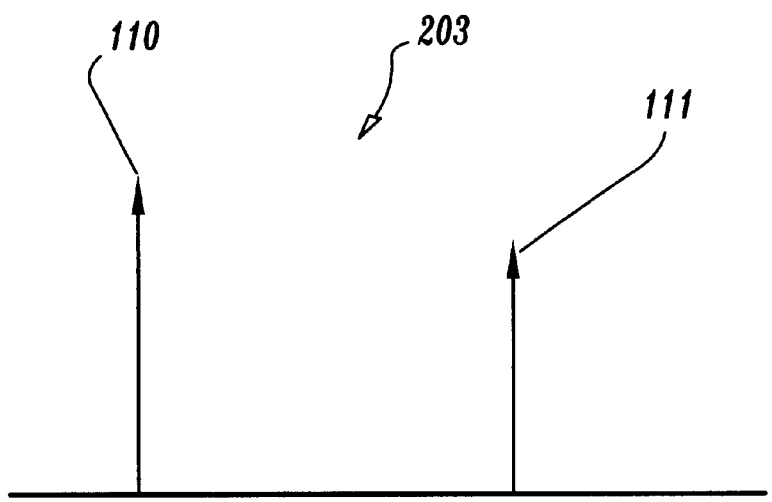
FIG. 4 is a frequency plane distribution showing a 2-beam illumination provided by the grating profile in FIG. 3 in accordance with the present invention.

As shown in FIG. 4, a resulting frequency plane distribution produced by phase grating 202 is illustratively shown having a two-beam interference pattern 203 in accordance with the present invention. This two-beam interference 203 leads to a sinusoidal image relief in a resist layer or other imaging surface, material or device (such as a CCD camera or other device, which can render a digital image). A dark-field image of the relief gives the diffraction efficiency. For a sinusoidal image, the dominant contributor comes from a first order diffraction. The maximum value of the first order diffraction through focus is shown in FIG. 5.

Figure 5:
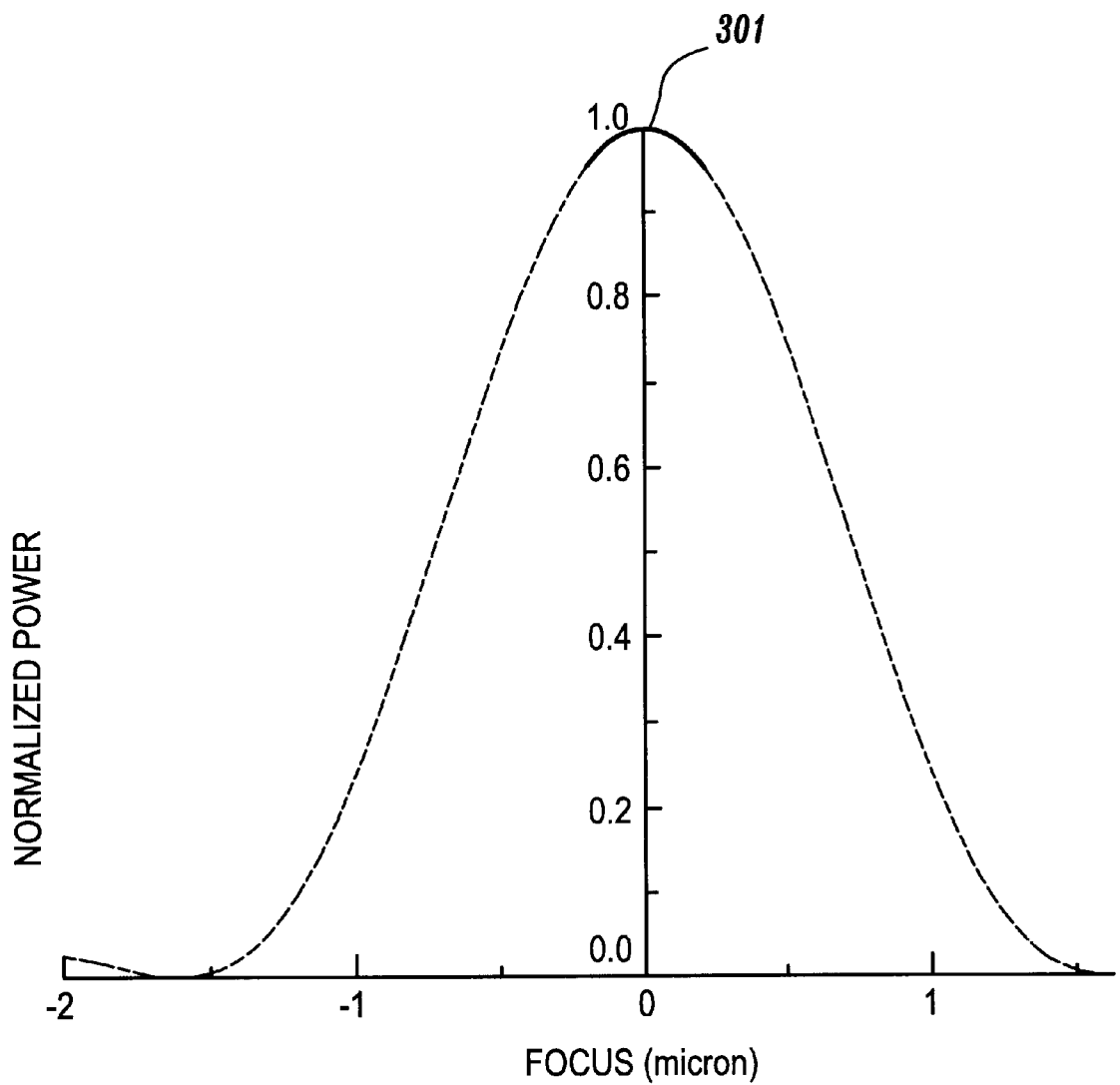
FIG. 5 shows first order diffraction efficiency of a sinusoidal image by a plot of normalized power showing amplitude of the first order diffraction as a function of focus setting in accordance with the present invention.

Referring to FIG. 5, the first order of the diffraction efficiency of a sinusoidal image is shown as normalized plot for a first order diffraction at best focus (or maximum focus). Best focus is determined by adjusting the focus of the lens system until a highest amplitude for the power is obtained. When best focus is obtained, the point of highest or peak power (amplitude) in the plot of normalized power versus focus setting is determined. In FIG. 5, the peak point or maximum point 301 is at zero focus. Maximum points (e.g., 301) are determined for a plurality of different orientations of reticle 204 (e.g., different angular orientations). On reticle 204 there are preferably gratings, each oriented at different azimuthal angles (incremented by 22.5 degrees, for example) and all exposed at the same time.

In this way, all orientations are exposed simultaneously and the resulting record is analyzed to give a record of best focus versus angle. The maximum points are then plotted as illustratively shown in FIG. 6. It should be noted that FIG. 6 is a plot simplified to illustrate the present invention.

Figure 6:
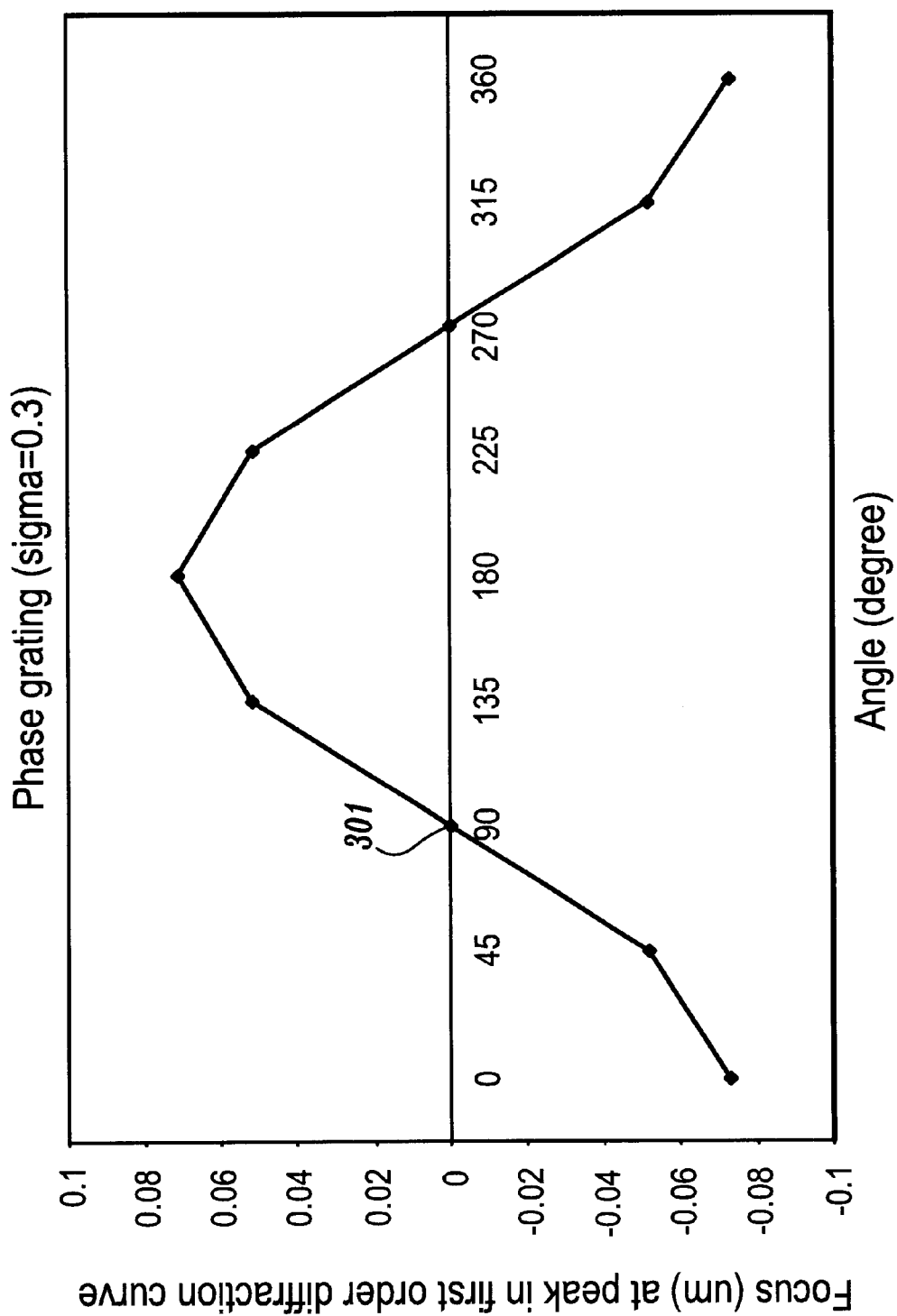
FIG. 6 is a plot of the focus setting a peak value for a plurality of reticle angles in the presence of coma in accordance with the present invention.

Referring to FIG. 6, a plot of maximum points for a plurality of different angular orientations is illustratively shown for a first order diffraction image (e.g., of the 2-beam image) with a coherence sigma ($\sigma$) of, for example, 0.3 for the reticle. After a plot of the peak locations in focus for a plurality of different orientations is obtained in FIG. 6, the plot is matched with simulations to extract the information about lens aberrations. This may be performed by creating a library of plots for lens or lens systems with predetermined aberrations and comparing the lens or lens system being evaluated with plots stored in the library. The library of plots may include data for actual lenses or through simulations of the lenses. The harmonic components of FIG. 6 may be determined by taking Fourier transforms of this curve and noting that each of the harmonics come from particular aberration terms. For example, the first harmonic is due to coma (the curve shown in FIG. 6 is due to coma, more complex curves may include a plurality of other aberrations as well) and the magnitude of this harmonic is compared to simulations. Because the first harmonic is linearly related to coma, it is only necessary to establish the proportionality constant and may not be necessary to refer to look up tables. Look up tables may be more appropriate for non-linear relationships.

A record of intensity or normalized power of a first order diffraction of the grating image may be plotted. In other words, a plot of intensity versus position for a constant focus setting is provided, as shown in FIG. 5. This is preferably performed at a focus, where the slope of the first order diffraction curve is high. Again, this image is then matched with simulations or previously evaluated lens plots (e.g., in a library of plots) to determine the azimuthal dependence of the aberrations, as described above.

In accordance with the present invention, radial dependence of lenses or lens systems may be performed by evaluating the lens by using different grating periods (e.g., widths). For example, the grating period, $d=2W+L$ (FIG. 3) can be increased or decreased. The location of the first order beam in FIG. 4 depends on the grating period d ($d_{min}=\lambda/(NA \cdot (1-\sigma))$, where $\lambda$ is the wavelength of light, NA is the numerical aperture of the lens system and $\sigma$=coherence factor). By varying the grating period, information about the radial components of the aberrations can be obtained and evaluated for a particular lens. A larger grating period results in the light diffracted by a smaller angle and therefore will illuminate the pupil closer to the zero order, undiffracted beam. A smaller period will cause the light to be diffracted to a larger pupil radius. Having several grating periods enables sampling of several different radii and thereby enables the separation of radial dependence of the aberrations.

Figure 7:
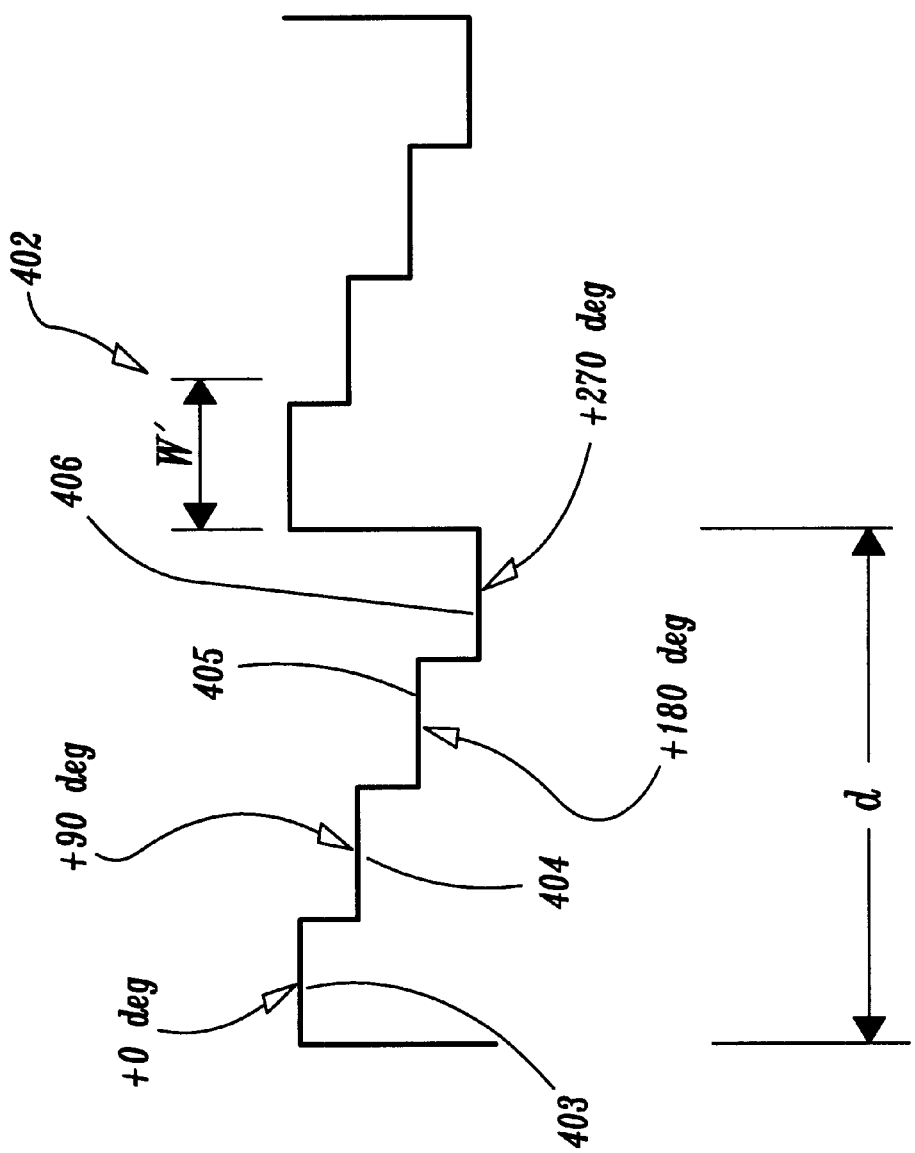
FIG. 7 is a cross-sectional view showing a grating profile in accordance with another embodiment of the present invention.

Referring to FIG. 7, another embodiment of the phase grating of the present invention is shown. Phase grating 402 includes four phase regions 403–406. Each region provides a 90 degree phase shift from adjacent regions. In one example, region 403 includes a 0 degree shift, region 404 a 90 degree shift, region 405 a 180 degree shift and region 406 a 270 degree shift. If the width W' of all four phases is the same, a single beam illumination can be achieved. By varying the width of the 90 degree and 270 degree phase, in a way that the total width (d) remains constant, the amplitude of the $1^{st}$ order beam can be adjusted. In other words, if the region 404 is increased, by x (e.g., W'+x), region 406 would be decreased by a same amount, x (e.g., W'-x). x may be between about 0% and about 100% of the width W'. This provides $1^{st}$ order beam adjustment so that the lens system can be evaluated. Another embodiment, may include three steps with widths for 0 degrees, 120 degrees and 240 degrees, all of about the same width.

Figure 8:
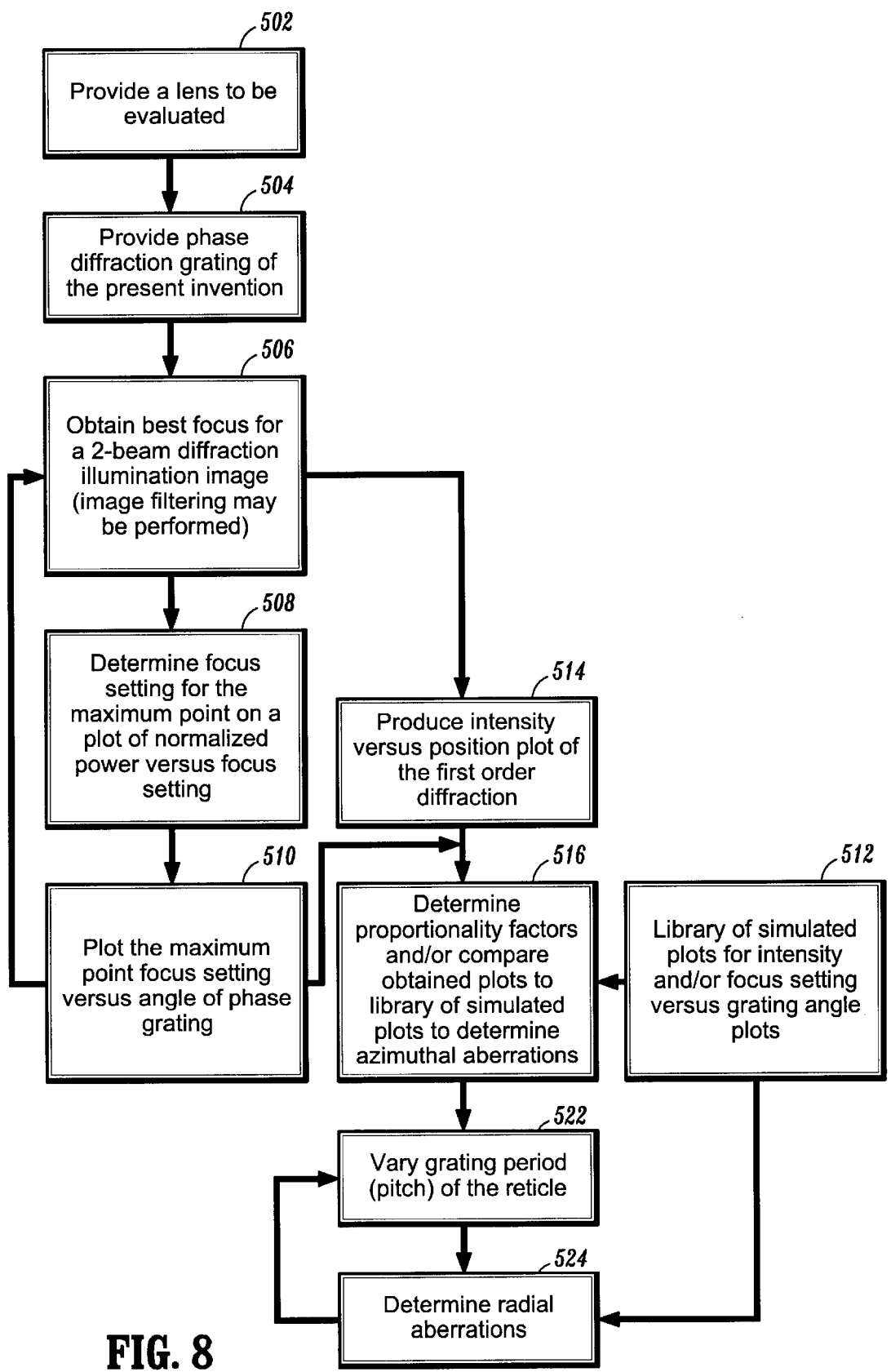
FIG. 8 is a flow diagram for a method of evaluating a lens in accordance with the present invention.

Referring to FIG. 8, a flow diagram is shown for evaluating a lens system in accordance with the present invention. In block 502, a lens system to be evaluated is provided. In block 504, a reticle having a grating profile in accordance with the present invention is provided. Light is propagated through reticle into a lens system to be evaluated using an external reference beam. In accordance with the present invention, a 2-beam illumination grating phase image is provided. The grating image is focused to obtain a best focus on a photoresist or into a camera, in block 506. The illumination image may be filtered to improve the best focus of the two-beam image, particularly if a reticle grating described in FIGS. 10A and 10B is employed). Then, in block 508 a normalized plot of energy (power) versus focus setting is obtained for a plurality of angular orientations of the phase grating. The plurality of angular orientations is preferably provided on the same reticle so that the reticle does not have to be changed. A maximum point is extracted from each normalized plot and focus versus angle (or orientation) is plotted in block 510. This is repeated for a plurality of phase grating orientations. If a reticle with multiple angles is employed, actual exposure includes a sequence of individual exposures, each with the focus incremented to get the through focus record.

A plot or result of focus versus azimuthal orientation is provided to block 516. In block 516, a Fourier transform of the result data from block 510 (or block 514 in an alternate embodiment) is compared to a library of plots or multiplied by a proportionality constant from block 512. In block 512, simulations are determined, or actual plots for lenses with known aberrations are provided in a library of plots or images. This may include intensity profiles and focus versus angle plots. The comparison step of block 514 may be performed manually or automatically by a machine, such as a computer, to determine azimuthal aberrations.

In block 522, this process is repeated for different grating periods, by sampling the pupil (103 in FIG. 2B) at a different radius. All these grating periods are preferably formed on the same reticle and may be exposed simultaneously on the same reticle so that the reticle does not have to be changed. The different grating periods provide more information about the lens aberrations since data is collected over a wide range of conditions. Then, a full set of radial aberrations are determined in block 524.

Aberrations may also be determined through the sinusoidal relief obtained on a photoresist layer (on which the diffraction pattern is focused) or into a camera or other image recording device. This image may be compared to the 2-beam illumination or to the reticle to provide information about the lens system.

In an alternate path, block 514 records an intensity profile of, for example, the first order diffraction image produced through the lens system by the reticle's grating profile. In block 516, the plot obtained in block 514 is compared with the simulated plots in block 512. This may be performed manually or automatically by a machine, such as a computer, to determine azimuthal aberrations.

The present invention is capable of simultaneously measuring coma, astigmatism, spherical, 3-leaf (3-foil) and 4-leaf (4-foil) aberrations in a lens system using any of the reticles of the present invention.

In block 522, the reticle with different grating periods is exposed. In this way, radial aberrations between diffraction images become apparent as a result of the different grating periods. This can be performed by, for example, matching diffraction lines (e.g., bright and dark lines) in block 524.

Figure 9A:
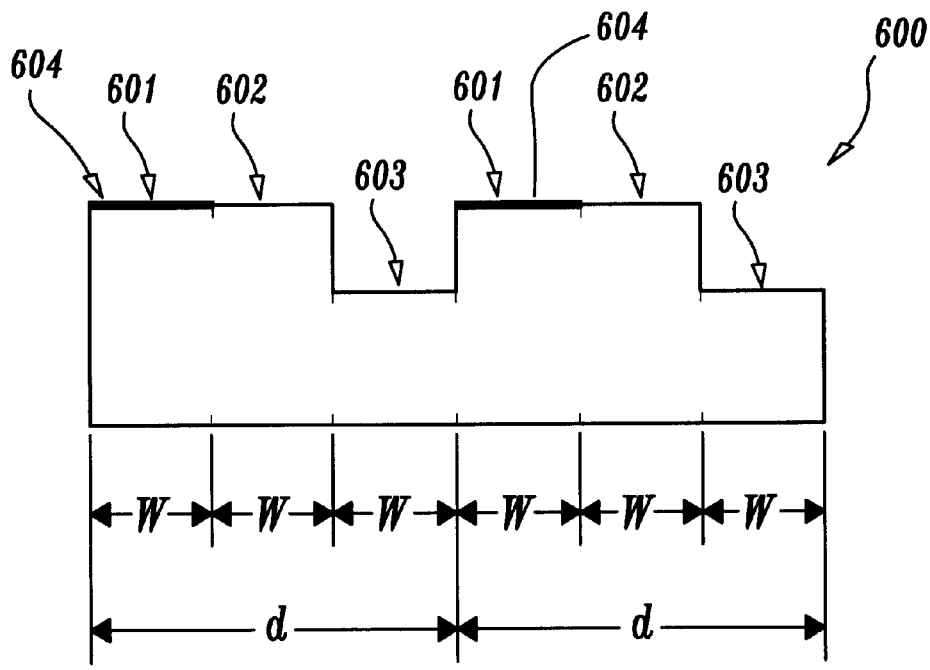
FIG. 9A is a cross-sectional view of a reticle in accordance with one preferred embodiment of the present invention.
Figure 9B:
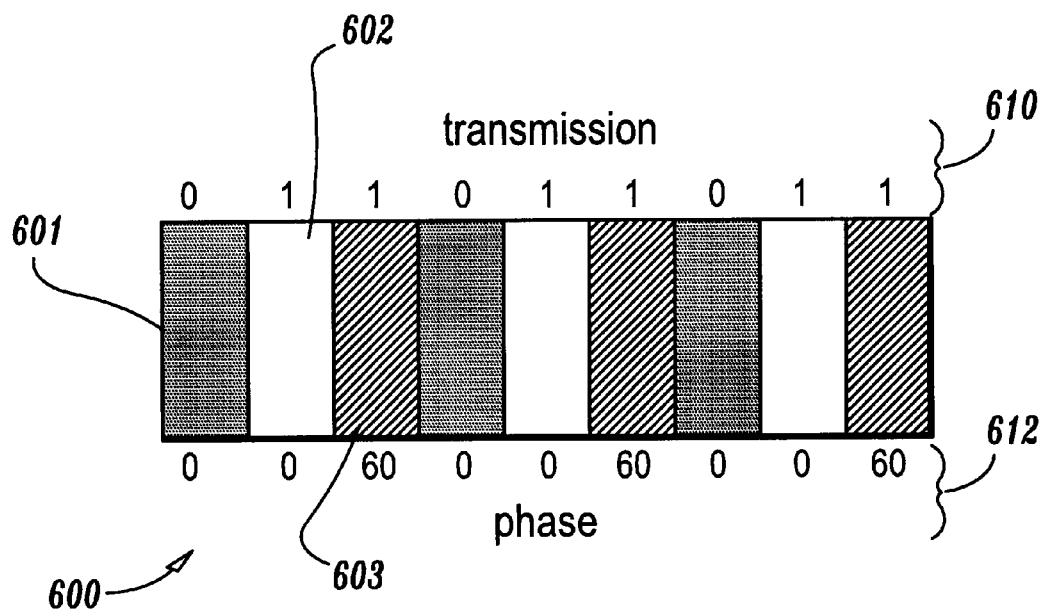
FIG. 9B is a top view of a portion of the reticle of FIG. 9A showing transmission and phase shift of light caused by portions of the grating in accordance with the present invention.

Referring to FIGS. 10A and 10B, in preferred embodiments, reticle gratings may employ transmissivity as well as phase shift to produce desired diffraction patterns for evaluating lens systems in accordance with the present invention. FIG. 9A shows a cross-sectional view of a diffraction grating 600 in accordance with the present invention, while FIG. 9B shows a top view of a section of grating 600 with transmission 610 information for each section listed above the respective portion and phase shift 612 listed below the respective portion. Grating 600 includes portions 601, 602 and 603 in one period d. Portions 601, 602 and 603 preferably are all equal in width (W=⅓ d).

In one embodiment, portion 601 is opaque (transmission of light equal to about 0). This may be provided by employing an opaque coating 604 such as a Cr coating. Portion 602 is transparent (light transmission equal to about 1) (Cr removed) and causes a 0 degree phase shift. Portion 603 is also transparent (e.g., light transmission equal to about 1) and causes a 60 degree phase shift. If a quartz substrate is employed a recess of, e.g., 81 nm is provided for portion 603 if 248 nm wavelength light is to be diffracted.

Grating 600 provides the useful feature of diffracting light into 0 and −1 orders that will form the two beam interference. In addition, all other diffracted orders will interfere in the image to produce structures with at least twice the spatial frequency by that formed by the interference of the 0 and −1 orders. This makes the higher orders easily identifiable and easy to filter out from the image.

Examination of the resulting relief image with a microscope that collects light diffracted from only the two beam interference pattern, and does not capture the light diffracted from the structures formed by the higher order interference, will result in observation of only the two beam interference. This filtering of the image after exposure greatly simplifies the experimental procedure because at the time of exposure, it is not necessary to limit the higher orders by closure of the numeric aperture of the lens under test to limit the exposure to only two beams. Advantageously, the higher orders all interact to produce grating relief in the exposure that will not perturb the judgement of the best two beam focus. Previously, it was necessary to crop off the higher orders by limiting the numerical aperture (NA) of the lens under test, but with the embodiment of FIGS. 10A and 10B, higher orders can be easily filtered out at the time of measurement since the higher orders are easily distinguishable. This is a significant advantage since it is very difficult to arbitrarily adjust the NA in a lithography tool that is in use for production. Examination is also possible with an ellipsometer and/or a scatterometer to detect diffraction efficiencies.

Figure 10:
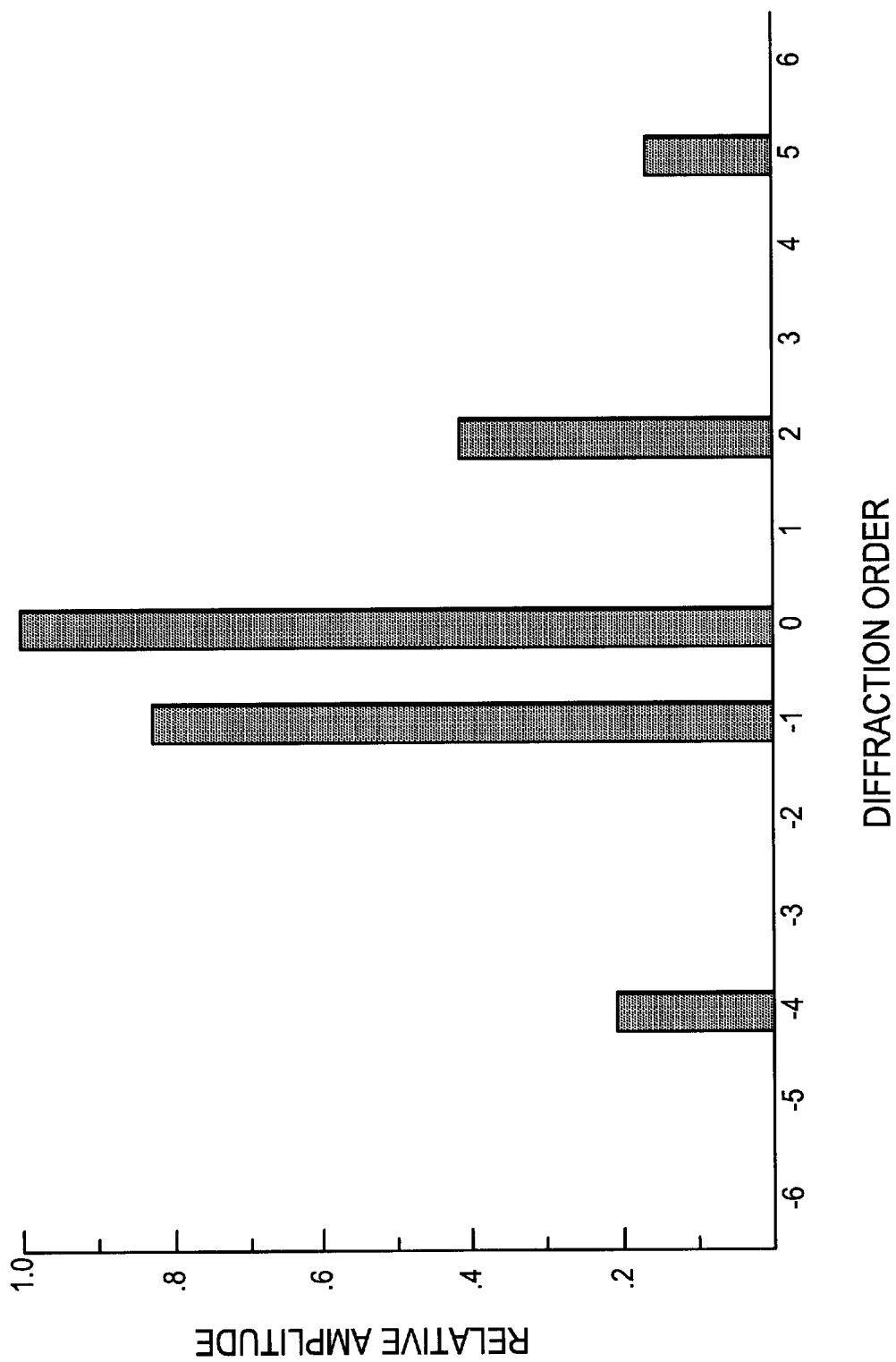
FIG. 10 is a bar chart showing relative amplitude versus diffraction order for the grating of FIGS. 9A and 9B in accordance with the present invention.

Referring to FIG. 10, a plot of relative amplitude versus diffraction order is illustratively shown for grating 600. FIG. 10 is shown for a lens with NA=0.7 operating at a wavelength of 248 nm. Grating 600 will pass portion of 5 diffraction orders (e.g., −4, −1, 0, 2 and 5). Advantageously, only the 0 and −1 orders will produce the low frequency fundamental. All other orders will be separated so that they give only higher order interference. Use of grating 600 obviates the need to reduce the numerical aperture (by a pupil or otherwise) since the −1 and 0 orders provide the two beam interference which can be employed for an interference pattern.

Having described preferred embodiments for grating patterns and method for determination of azimuthal and radial aberration (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for evaluating a lens, comprising:
   a reticle which permits light to pass therethrough including a first surface;
   a grating profile formed on the first surface, the grating profile including a plurality of grouped stepped portions;
   each group of the stepped portions including:
      a first step which prevents light from propagating therethrough;
      a second step which propagates light therethrough; and
      a third step which propagates light therethrough at an angle 60 degrees out of phase with the light propagated through the second step.

2. The apparatus as recited in claim 1, wherein the first step, second step and the third step include a width of W.

3. The apparatus as recited in claim 1, wherein the first step is coated with an opaque material.

4. The apparatus as recited in claim 1, wherein the reticle generates a 2-beam diffraction image when focused by a lens.

5. An apparatus for evaluating a lens, comprising:
a reticle which permits light to pass therethrough including a first surface;
a grating profile formed on the first surface, the grating profile including a plurality of grouped stepped portions;
each group of the stepped portions including:
a first step which propagates light therethrough at a first phase angle;
a second step which propagates light therethrough at an angle 90 degrees out of phase with the first phase angle; and
a third step which propagates light therethrough at an angle 180 degrees out of phase with the first phase angle.

6. The apparatus as recited in claim 5, wherein the first step and the third step include a width of W and the second step include a width of 2W.

7. The apparatus as recited in claim 5, further comprising a fourth step which propagates light therethrough at an angle 270 degrees out of phase with the first phase angle.

8. The apparatus as recited in claim 7, wherein the first and third steps have a same width W.

9. The apparatus as recited in claim 8, wherein the second and fourth steps have a sum of widths equal to 2W.

10. The apparatus as recited in claim 9, wherein one of the second step and the fourth step has a width of W−x and the other has a width of W+x, where x is a fixed dimension.

11. The apparatus as recited in claim 5, wherein the reticle generates a 2-beam diffraction image when focused by a lens.

12. A method for evaluation of a lens for azimuthal aberrations, comprising the steps of:
providing a diffracted reticle image by propagating light through the reticle, the reticle including a grating profile including a plurality of grouped stepped portions, each group of stepped portions including:
a first step which prevents light from propagating therethrough;
a second step which propagates light therethrough; and
a third step which propagates light therethrough at an angle 60 degrees out of phase with the light propagated through the second step;
focusing the diffracted reticle image to determine a focus setting for a maximum amplitude of a first diffraction for a plurality of reticle angles;
plotting the focus settings versus the rericle angles to obtain a plot; and
matching the plot against a library of plots or simulations to determine azimuthal aberrations for evaluating the lens.

13. The method as recited in claim 12, wherein the first step, the second step and the third step include a same width.

14. The method as recited in claim 12, further comprising the step of providing the reticle with gratings of different pitch between the groups of stepped portions to obtain a diffracted reticle image with different grating pitches.

15. The method as recited in claim 14, further comprising the step of comparing diffracted reticle images for different grating pitches to determine radial aberration of the lens.

16. The method as recited in claim 12, wherein the diffracted reticle image provides a 2-beam illumination when focused by a lens.

17. The method as recited in claim 12, wherein the step of matching the plot includes the step of simultaneously measuring coma, astigmatism, spherical, 3-leaf (3-foil) and 4-leaf (4-foil) aberrations.

18. A method for evaluation of a lens for azimuthal aberrations, comprising the steps of:
providing a diffracted reticle image by propagating light through the reticle, the reticle including a grating profile including a plurality of grouped stepped portions, each group of stepped portions including:
a first step which prevents light from propagating therethrough;
a second step which propagates light therethrough; and
a third step which propagates light therethrough at an angle 60 degrees out of phase with the light propagated through the second step;
recording an intensity profile at a constant focus setting for the diffracted reticle image to provide a plot of intensity as a function of position in the diffracted reticle image; and
matching the plot against a library of plots or simulations to determine azimuthal aberrations for evaluating the lens.

19. The method as recited in claim 18, wherein the first step, the second step and the third step include a same width.

20. The method as recited in claim 18, further comprising the step of providing the reticle with gratings of different pitch between the groups of stepped portions to obtain a diffracted reticle image with different grating pitches.

21. The method as recited in claim 20, further comprising the step of comparing diffracted reticle images for different grating pitches to determine radial aberration of the lens.

22. The method as recited in claim 18, wherein the diffracted reticle image provides a 2-beam illumination when focused by a lens.

23. The method as recited in claim 18, wherein the step of matching the plot includes the step of simultaneously measuring coma, astigmatism, spherical, 3-leaf (3-foil) and 4-leaf (4-foil) aberrations.

24. A method for evaluation a lens for azimuthal aberrations, comprising the steps of:
providing a diffracted reticle image by propagating light through the reticle, the reticle including a grating profile including a plurality of grouped stepped portions, each group of stepped portions including:
a first step which propagates light therethrough at a first phase angle,
a second step which propagates light therethrough at an angle 90 degrees out of phase with the first phase angle, and
a third step which propagates light therethrough at an angle 180 degrees out of phase with the first phase angle;
focusing the diffracted reticle image to determine a focus setting for a maximum amplitude of a first diffraction for a plurality of reticle angles;
plotting the focus settings versus the reticle angles to obtain a plot; and
matching the plot against a library of plots or simulations to determine azimuthal aberrations for evaluating the lens.

25. The method as recited in claim 24, wherein the first step and the third step include a width of W and the second step include a width of 2W.

26. The method as recited in claim 24, further comprising the step of providing the reticle with gratings of different pitch between the groups of stepped portions to obtain a diffracted reticle image with different grating pitches.

27. The method as recited in claim 26, further comprising the step of comparing diffracted reticle images for different grating pitches to determine radial aberration of the lens.

28. The method as recited in claim 24, wherein the diffracted reticle image provides a 2-beam illumination when focused by a lens.

29. The method as recited in claim 24, wherein the step of matching the plot includes the step of simultaneously measuring coma, astigmatism, spherical, 3-leaf (3-foil) and 4-leaf (4-foil) aberrations.

30. A method for evaluation a lens for azimuthal aberrations, comprising the steps of:
   providing a diffracted reticle image by propagating light through the reticle, the reticle including a grating profile including a plurality of grouped stepped portions, each group of stepped portions including:
      a first step which propagates light therethrough at a first phase angle,
      a second step which propagates light therethrough at an angle 90 degrees out of phase with the first phase angle, and
      a third step which propagates light therethrough at an angle 180 degrees out of phase with the first phase angle;
   recording an intensity profile at a constant focus setting for the diffracted reticle image to provide a plot of intensity as a function of position in the diffracted reticle image; and
   matching the plot against a library of plots or simulations to determine azimuthal aberrations for evaluating the lens.

31. The method as recited in claim 30, wherein the first step and the third step include a width of W and the second step include a width of 2W.

32. The method as recited in claim 30, further comprising the step of providing the reticle with gratings of different pitch between the groups of stepped portions to obtain a diffracted reticle image with different grating pitches.

33. The method as recited in claim 32, further comprising the step of comparing diffracted reticle images for different grating pitches to determine radial aberration of the lens.

34. The method as recited in claim 30, wherein the diffracted reticle image provides a 2-beam illumination when focused by a lens.

35. The method as recited in claim 30, wherein the step of matching the plot includes the step of simultaneously measuring coma, astigmatism, spherical, 3-leaf (3-foil) and 4-leaf (4-foil) aberrations.

* * * * *